(12) United States Patent
Onuma et al.

(10) Patent No.: US 7,474,430 B2
(45) Date of Patent: Jan. 6, 2009

(54) CONVEYANCE OF INFORMATION RELATING TO PRINTER CAPABILITY

(75) Inventors: Nobuo Onuma, Kanagawa (JP); Tetsuya Kawanabe, Kanagawa (JP); Tetsuhito Ikeda, Tokyo (JP); Hirokazu Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 952 days.

(21) Appl. No.: 10/885,661

(22) Filed: Jul. 8, 2004

(65) Prior Publication Data
US 2005/0012954 A1    Jan. 20, 2005

(30) Foreign Application Priority Data
Jul. 16, 2003    (JP)    ............... 2003-197921

(51) Int. Cl.
G06F 3/12    (2006.01)
G06F 15/00    (2006.01)
(52) U.S. Cl. .............. 358/1.15; 358/1.13; 358/1.6
(58) Field of Classification Search .......... 358/1.15, 358/1.13, 1.18, 1.14, 1.12, 1.9, 1.6, 1.1, 407, 358/468, 1.16, 1.17, 1.2, 400, 401, 1.5, 1.11; 348/207.2, 207.99; 347/2, 3, 5, 14, 23; 399/1, 399/8
See application file for complete search history.

(56) References Cited

U.S. PATENT DOCUMENTS 6,713,830 B2    3/2004    Nishimura et al. .......... 257/421
6,940,541 B1 *  9/2005    Small .................... 348/207.2
7,212,229 B2 *  5/2007    Parulski et al. ........... 348/207.2
2002/0105678 A1  8/2002   Shiraiwa ..................... 358/1.15
2004/0167997 A1  8/2004   Ikeda ........................ 710/15

FOREIGN PATENT DOCUMENTS

JP    2000-035864    2/2000
JP    2001-160939    6/2001
JP    2002-237974    8/2002
KR    2002-65853     8/2002

OTHER PUBLICATIONS

"PIMA 15740:2000 Photography—Electronic Still Picture Imaging—Picture Transfer Protocol (PTP) for Digital Still Photography Devices", published by Photographic and Imaging Manufacturers Association, Inc., Jul. 5, 2000.
"White Paper of CIPA DC-001-2003 Digital Photo Solutions for Imaging Devices", published by Camera & Imaging Products Association, Feb. 3, 2003.

* cited by examiner

Primary Examiner—Dov Popovici
(74) Attorney, Agent, or Firm—Fitzpatrick, Cella, Harper & Scinto

(57) ABSTRACT

A printer and a digital camera are connected so as to be capable of communicating with each other. The printer transmits information indicative of its capabilities to the digital camera and the digital camera incorporates the transmitted printer capability information in a print settings menu. The capability information has information relating to the printer capabilities and information indicative of a default setting. The capabilities of the printer are incorporated in the print settings menu together with the default setting. A desired printing condition can be set selectively at the digital camera using the print settings menu in which the capability information has been incorporated.

16 Claims, 6 Drawing Sheets

FIG. 2

PAPER-SIZE LIST

| DEFAULT |
| :---: |
| L |
| 2L |
| POSTCARD |
| A4 |

FIG. 3

MEDIA-TYPE LIST

| DEFAULT |
|---|
| GLOSSY PAPER |
| MATTE PAPER |
| PLAIN PAPER |

FIG. 4

PAPER-SIZE LIST

| |
|---|
| L |
| 2L |
| DEFAULT |
| POSTCARD |
| A4 |

CONVEYANCE OF INFORMATION RELATING TO PRINTER CAPABILITY

CLAIM OF PRIORITY

This application claims priority from Japanese Patent Application No. 2003-197921 filed on Jul. 16, 2003, the entire contents of which are incorporated herein by reference.

FIELD OF THE INVENTION

This invention relates to a technique, which is applicable in an arrangement in which a printer and an image output apparatus such as a digital camera communicate, for conveying information relating to capabilities such as the printing functions of the printer to the image output apparatus.

BACKGROUND OF THE INVENTION

Arrangements in which a printer and digital camera are connected directly using an interface such as a USB so that photographic images that have been recorded on a recording medium within the digital camera may be printed by the printer are becoming increasingly popular (see the specification of Japanese Patent Application Laid-Open No. 2001-160939). Since these arrangements do not particularly require the intermediary of a personal computer, they are convenient in that they enable easy printing to be performed by users who wish to print photographs taken by a digital camera yet who are not very skilled at using a personal computer. Though it would be convenient in this case if a user could print photographs by connecting his or her own digital camera with any printer together at will, it is generally the case that such printing of photographs can be achieved only by a limited number of combinations of a digital camera and printer that support direct printing. In many cases such direct printing is possible only with a digital camera and printer made by the same manufacturer. Further, in a case where settings relating to printing are made on the screen of the digital camera, generally the user makes the settings using a print menu, which has been programmed permanently within the digital camera, without knowing what the printing capabilities of the connected printer are.

When the print menu programmed permanently in the digital camera is displayed, a menu that conforms to the functions of the connected printer cannot be displayed, as a consequence of which the capabilities of the printer cannot manifest themselves fully. For example, assume that size A4 paper is the maximum paper size that can be designated on the permanent menu of the digital camera. Even if a printer that can print up to size A3 is connected to this digital camera, size A3 paper cannot be selected from the camera menu and, hence, the printer cannot be made to print on size A3 paper. On the other hand, according to a standard made public in February, 2003 for implementing direct printing by connecting a digital camera and a printer, a scheme in which a list of, e.g., paper sizes supported by the printer is reported to the digital camera by list-format data is adopted. Specifically, not only paper size but also media type, whether or not the date should be printed and whether or not trimming processing should be executed also are conveyed to the digital camera in the form of a list. In a case where it is desired to set up the printing-related menu on the digital camera in simple fashion, it may be considered to leave the printing conditions up to the printer. That is, by not causing the print menu to be displayed each time and instead setting all of the possible designations to default and then communicating this to the printer, printing can be implemented according to settings decided uniquely by the printer. However, in this case the digital camera cannot specifically ascertain what the settings corresponding to the defaults set uniquely by the printer are. This is inconvenient.

Further, with a printer of the type in which a setting corresponding to a default can be made and changed at will by operating a panel on the printer side, it is possible to set paper size not to the usual L-size designation, for example, but to 2L or A4 by making a change. A problem with the prior art is that under such dynamically changing circumstances, a digital camera cannot specifically ascertain what the setting that corresponds to changed default is.

As a result, though a user can specify and perform printing in simple fashion by operating the digital camera, an inconvenience which arises is that the user cannot determine what size printing paper should be set in the printer.

SUMMARY OF THE INVENTION

The present invention has been made in consideration of the above circumstances and its object is to eliminate at least one of the above-mentioned inconveniences and make it possible to report default settings without complicated processing and without setting a separate, special format.

According to the present invention, the foregoing object is attained by providing a communication apparatus which communicates with a printer comprising: a communication unit that communicates with the printer; and a setting unit that sets choices of print condition in accordance with capability information of the printer received by the communication unit, wherein the capability information includes first information relating to capabilities of the printer and second information indicating a default setting, and the setting unit sets any of the first information to default on the basis of the second information.

According to the present invention, the foregoing object is also attained by providing a control method of a communication apparatus which communicates with a printer comprising: receiving from the printer capability information of the printer which includes first information relating to capabilities of the printer and second information indicating a default setting; setting choices of print condition in accordance with the received capability information of the printer; and setting any of the first information to default on the basis of the second information.

Further, the foregoing object is also attained by providing an image output apparatus for outputting image data to a printer by communication, comprising: a communication unit that communicates with the printer; an incorporating unit that receives capability information, which represents capabilities of the printer, by communication and incorporates the capability information in a print settings menu; and a setting unit that selectively sets a desired print condition from the print settings menu, wherein the capability information includes first information relating to capabilities of the printer and second information indicating a default setting, and the incorporating unit incorporates the default setting in the print settings menu.

Furthermore, the foregoing object is also attained by providing a method of controlling an image output apparatus for outputting image data to a printer by communication, comprising: communicating with the printer; receiving capability information, which represents capabilities of the printer, by the communication and incorporating the capability information in a print settings menu; and selectively setting a desired print condition from the print settings menu, wherein the capability information includes first information relating to capabilities of the printer and second information indicating a default setting, and the default setting is incorporated in the print settings menu.

Further, the foregoing object is also attained by providing a printer to which image data is input from an image output apparatus by communication, comprising: a communication unit that communicates with the image output apparatus; and a transmitting unit that transmits capability information, which represents capabilities of the printer, to the image output apparatus via the communication unit, wherein the capability information is described in a list format in which list entries are first information, which indicates capabilities of the printer, and second information, which indicates a default setting.

Further, the foregoing object is also attained by providing a method of controlling a printer to which image data is input from an image output apparatus by communication, comprising: communicating with the image output apparatus; and transmitting capability information, which represents capabilities of the printer, to the image output apparatus; wherein the capability information is described in a list format in which list entries are first information, which indicates capabilities of the printer, and second information, which indicates a default setting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates an example of data in a list format indicating paper sizes, which are presently supported by a printer, reported from the printer to a digital camera;

FIG. 3 illustrates an example of data in a list format indicating media types, which are presently supported by the printer, reported from the printer to the digital camera;

FIG. 4 illustrates another example of data in a list format indicating paper sizes, which are presently supported by the printer, reported from the printer to the digital camera;

DETAILED DESCRIPTION OF THE PREFERRED EMBODIMENTS

Preferred embodiments of the present invention will be described in detail in accordance with the accompanying drawings.

First Embodiment

Figure 1:
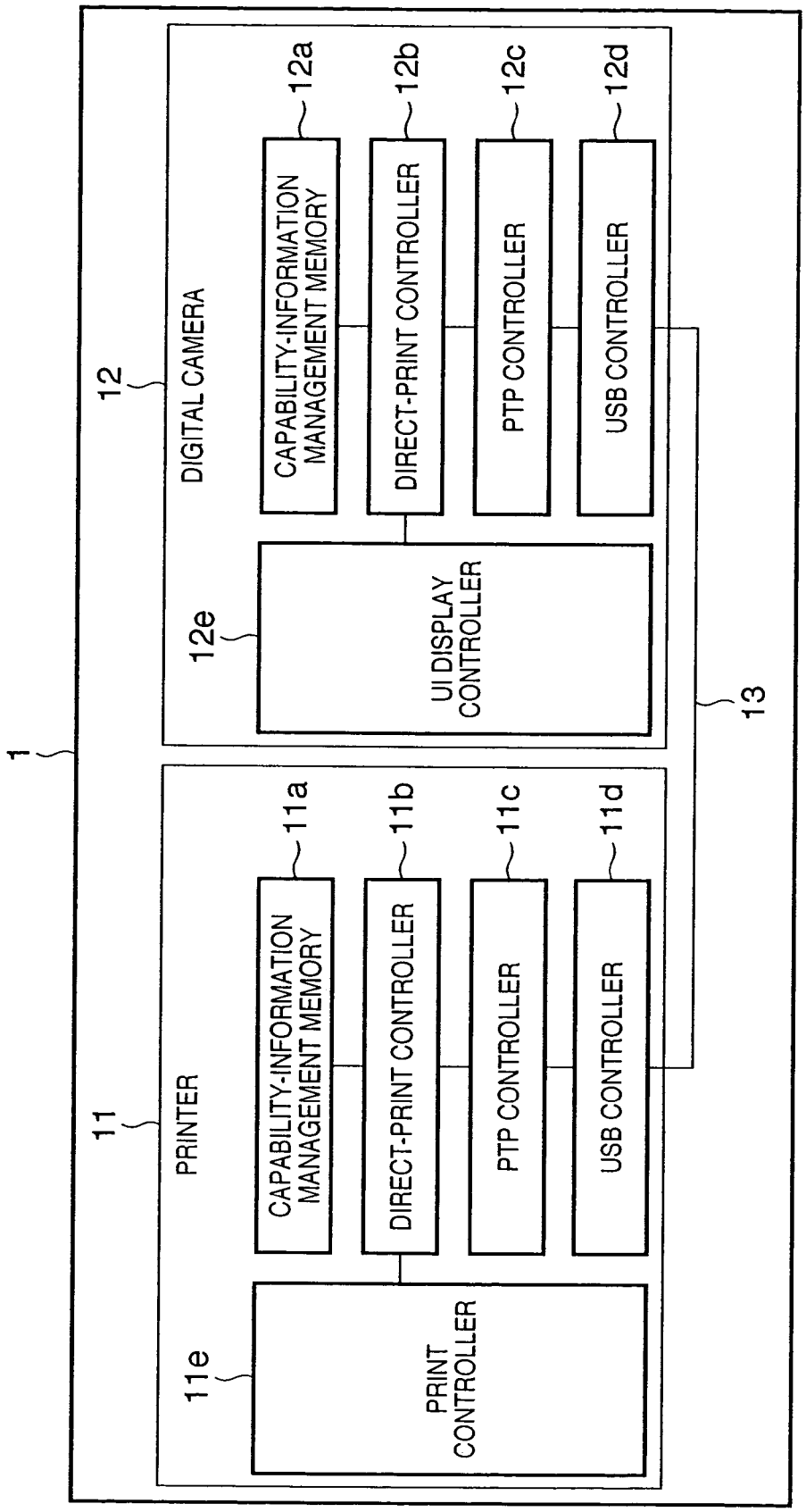
FIG. 1 is a block diagram illustrating the configuration of a printing system according to an embodiment of the present invention.

FIG. 1 is a block diagram illustrating the configuration of a printing system 1 according to an embodiment of the invention. The printing system 1 includes a printer 11 and a digital camera 12 that are interconnected by a USB or other interface cable 13.

The printer 11 has a capability-information management memory 11a, a direct-print controller 11b, a PTP controller 11c, a USB controller 11d and a print controller 11e.

The digital camera 12 serving as an image output apparatus comprises a capability-information management memory 12a, a direct-print controller 12b, a PTP controller 12c, a USB controller 12d and a UI (User Interface) display controller 12e.

The capability-information management memory 11a stores information indicating the capabilities of the printer 11 and information indicative of default settings, which have been set fixedly in the printer 11, or default settings that are set upon recognizing the present status of the printer 11.

The capability-information management memory 12a stores capability information (capabilities) that has been sent from the printer 11.

The direct-print controllers 11b, 12b control execution of the direct-print operation by programs, which are for executing direct printing, in the application layer of communication layers.

The PTP controllers 11c, 12c exercise communication control based upon the Picture Transfer Protocol (abbreviated to "PTP" below), which is used in this embodiment.

The USB controllers 11d, 12d exercise communication control relating to the USB (Universal Serial Bus) standard, which is used in this embodiment.

The print controller 11e actually controls printing in accordance with printing conditions that have been set by the digital camera 12.

The UI display controller 12e displays the capability information (capabilities), which has been sent from the printer 11, by incorporating this information in a print settings menu, and controls a display unit in accordance with operation by a user who makes print settings using a control panel, which is not shown.

The above-mentioned controllers, i.e., the components other than the capability-information management memories 11a, 12a, may be implemented by dedicated circuits. However, it is also permissible to perform control by software executed by a CPU (not shown) in accordance with a program that has been stored in memory, not shown.

Figure 2:
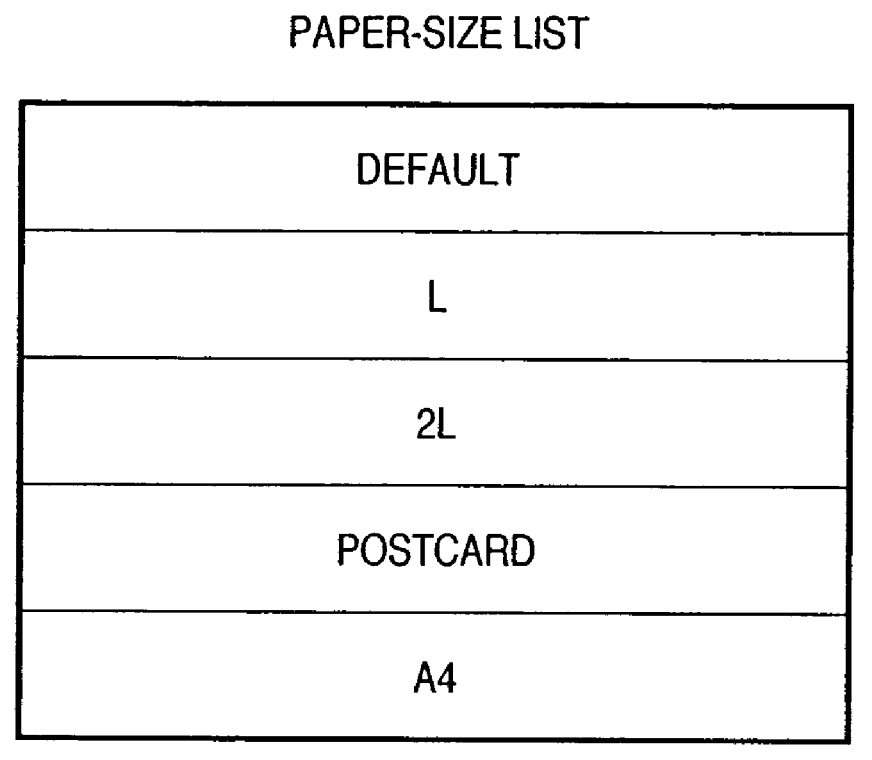
Figure 4:
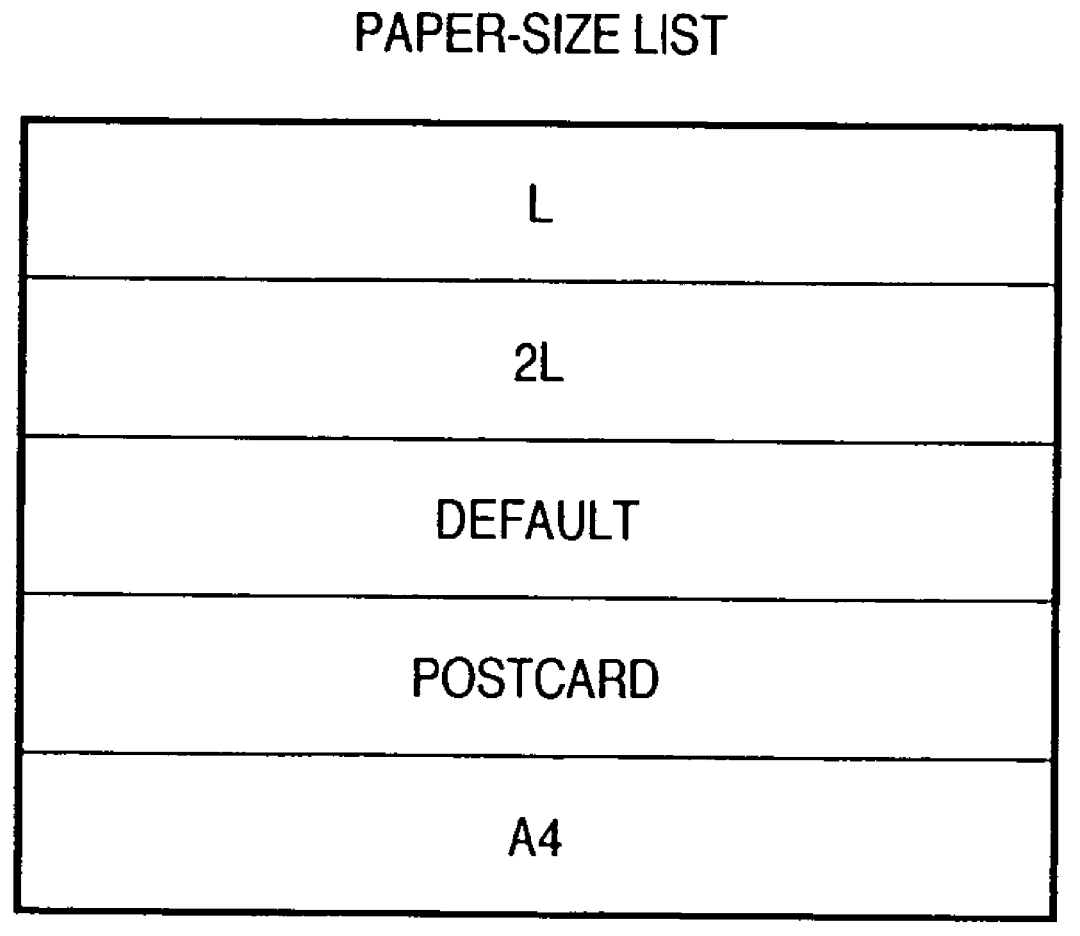

FIGS. 2 to 4 illustrate examples of lists sent from the printer 11 to the digital camera 12, which serves as the image output apparatus, as printer capabilities. It should be noted that a condition that the printer 11 sets as a default is decided on beforehand to be the condition described in the list following "DEFAULT". Of course, a print condition listed ahead of "DEFAULT" may also be decided on beforehand to be a default print condition.

Furthermore, in a case where "DEFAULT" has been listed at the very bottom, a condition that has been set at the very top may be the default print condition.

FIG. 2 illustrates an example of data in a list format indicating paper sizes, which are presently supported by the printer 11, reported from the printer 11 to the digital camera 12. This paper-size list shows DEFAULT, size L, size 2L, postcard and A4 in order from the top, and therefore, it will be understood that the printer 11 supports four types of paper sizes, namely L, 2L, postcard and A4. Further, since the value set at the position following "DEFAULT" is L, this indicates that the printer 11 will print on size L paper when default is designated to the printer 11.

FIG. 3 illustrates an example of data in a list format indicating media types, which are presently supported by the printer 11, reported from the printer 11 to the digital camera 12. This media-type list shows DEFAULT, glossy paper, matte paper and plain paper in order from the top, and therefore it will be understood that the printer 11 supports three types of media, namely glossy, matte and plain paper. Further, since the value set at the position following "DEFAULT" is glossy paper, this indicates that the printer 11 will print on gloss paper when default is designated to the printer 11.

FIG. 4 illustrates another example of data in a list format indicating paper sizes, which are presently supported by the printer 11, reported from the printer 11 to the digital camera 12. Here the position at which "DEFAULT" has been inserted differs from that of the paper-size list shown in FIG. 2. It will be understood from this list that postcard size is used when the default has been specified. This is the case for a printer so adapted that the default paper size can be changed dynamically as by a control panel (not shown) provided on the printer 11. This exemplifies a case where size L was specified as the default originally, as shown in FIG. 2, but has been changed at the control panel to the postcard size to serve as the default.

Figure 5:
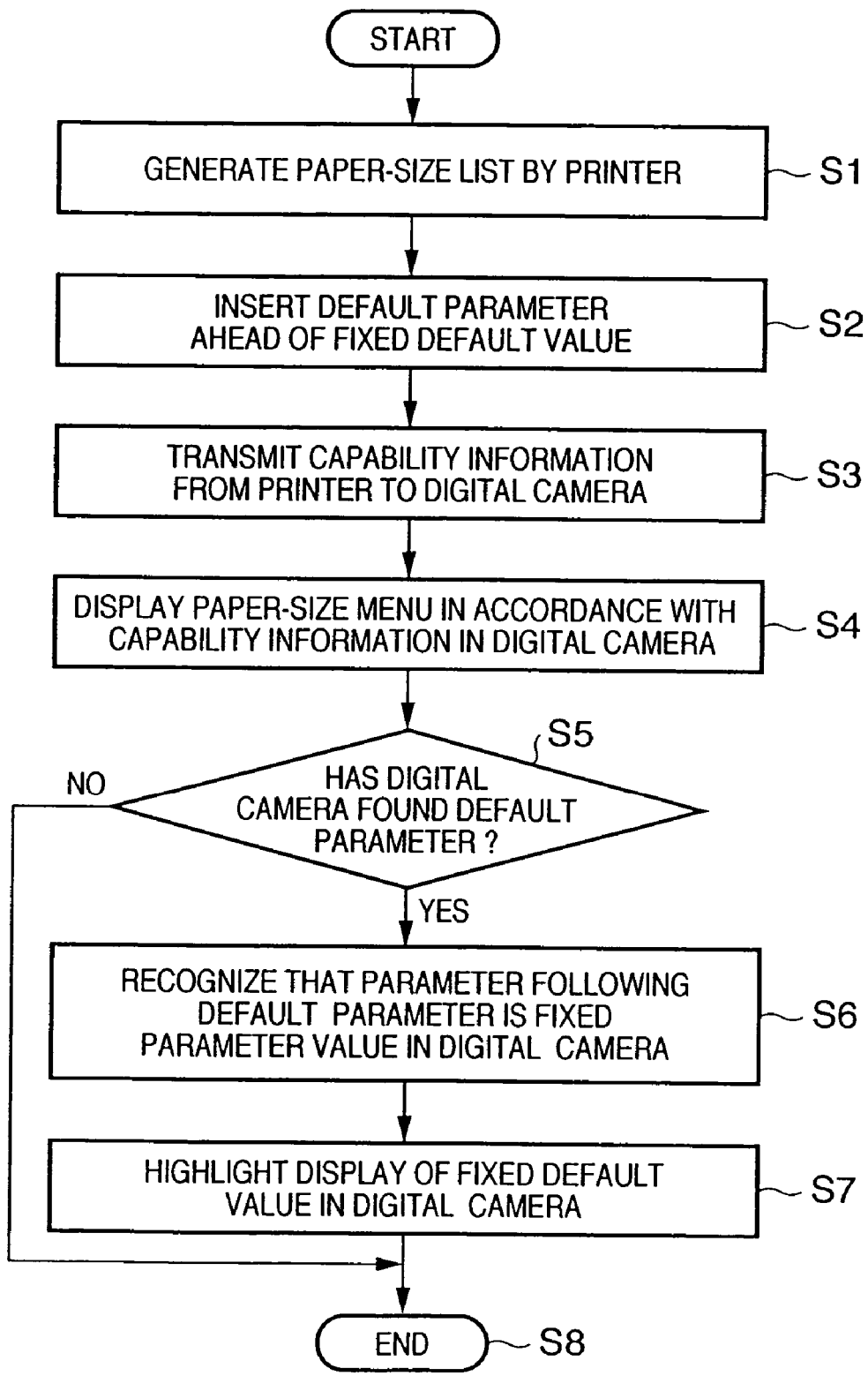
FIG. 5 is a flowchart illustrating an algorithm executed by the printing system of FIG. 1 according to a first embodiment of the present invention, which algorithm is for displaying, on the menu of a digital camera, a paper-size menu having a default that has been set by a printer fixedly and uniquely.

FIG. 5 is a flowchart illustrating an algorithm executed by the printing system 1 of FIG. 1, which algorithm is for displaying, on the menu of the digital camera, a paper-size menu having a default that has been set by the printer 11 fixedly and uniquely.

First, at step S1, the printer 11 provides a paper-size list, which is a list of paper sizes supported by the printer 11, in the capability-information management memory 11a as list-format data of the kind shown in FIG. 2. With FIG. 2 serving as an example, the paper-size types supported by the printer 11 are four in number, namely L, 2L, postcard and A4. Further, default print condition is fixedly decided to be size L. Next, at step S2, the direct-print controller 11b obtains the fixed default paper size (size L in this case) used by the printer 11 and inserts "DEFAULT" at the position immediately ahead of this paper size in the list, this being done in the list-format paper-size data prepared at step S1. It should be noted that "DEFAULT" is inserted immediately ahead of the default paper size in this embodiment, however, the present invention is not limited to this. It is possible to acquire vender information of a printer and a digital camera in advance, and the insertion position of "DEFAULT" is changed either immediately ahead of or immediately following the default value depending upon vender names of the printer and the camera known from the vender information. Next, at step S3, the printer 11 transmits the prepared list-format paper-size data as capability information to the digital camera 12 via the PTP controller 11c and USB controller 11d. Then, at step S4, the digital camera 12 receives the capability information from the printer 11 via the USB controller 12d and PTP controller 12c and displays the menu of paper sizes. If it is assumed that the list-format data exemplified by FIG. 2 has been received, then five types of paper sizes, namely DEFAULT, L, 2L, postcard and A4, are displayed as the menu by the UI display controller 12e. At this time "DEFAULT" may be displayed as one choice in the menu or may not be displayed. If it is not displayed, then four types of paper sizes, namely L, 2L, postcard and A4, will be displayed as the menu of paper sizes.

Next, at step S5, the digital camera 12 searches for "DEFAULT" in the list-format paper-size menu received at step S4 and finds the position of "DEFAULT". If "DEFAULT" is found, then control proceeds to step S6. If "DEFAULT" is not found, then processing ends. At step S6, the digital camera 12 recognizes that the paper size at the position that immediately follows "DEFAULT" found at step S5 is the paper size decided uniquely by the printer 11 and used fixedly thereby. Next, at step S7, the digital camera 12 highlights the display of the paper size recognized at step S6 (or encloses the paper size by a colored border or attaches an easily understood mark thereto), thereby informing the user of which paper size the printer 11 is currently requesting. At this time the default condition already specified as the print condition may be placed in the selected state.

The processing shown in FIG. 5 has been described taking paper size as an example for the sake of explanation. However, list-format data relating to media type or layout besides paper size may be placed in the capability information and displayed on the user interface of the digital camera.

It should be noted that the actual way in which the list data of FIGS. 2 to 4 is sent may take on any format. For example, the data of FIG. 2 may be arranged horizontally as follows:

Paper size: DEFAULT, L size, 2L size, postcard, A4

It should be noted that by including information indicative of "DEFAULT" as one of each of the capabilities (choices) in the capability information, a simpler design will suffice in comparison with a case where a special-purpose bit, a command or the like.

Further, which of the choices indicating the capabilities corresponds to default can be informed as a capability information list by adding a simple choice "DEFAULT".

On the side that has received the capability information, control can be performed to display default information as one of the choices by merely displaying the default information as is, or not display the information.

Second Embodiment

Figure 6:
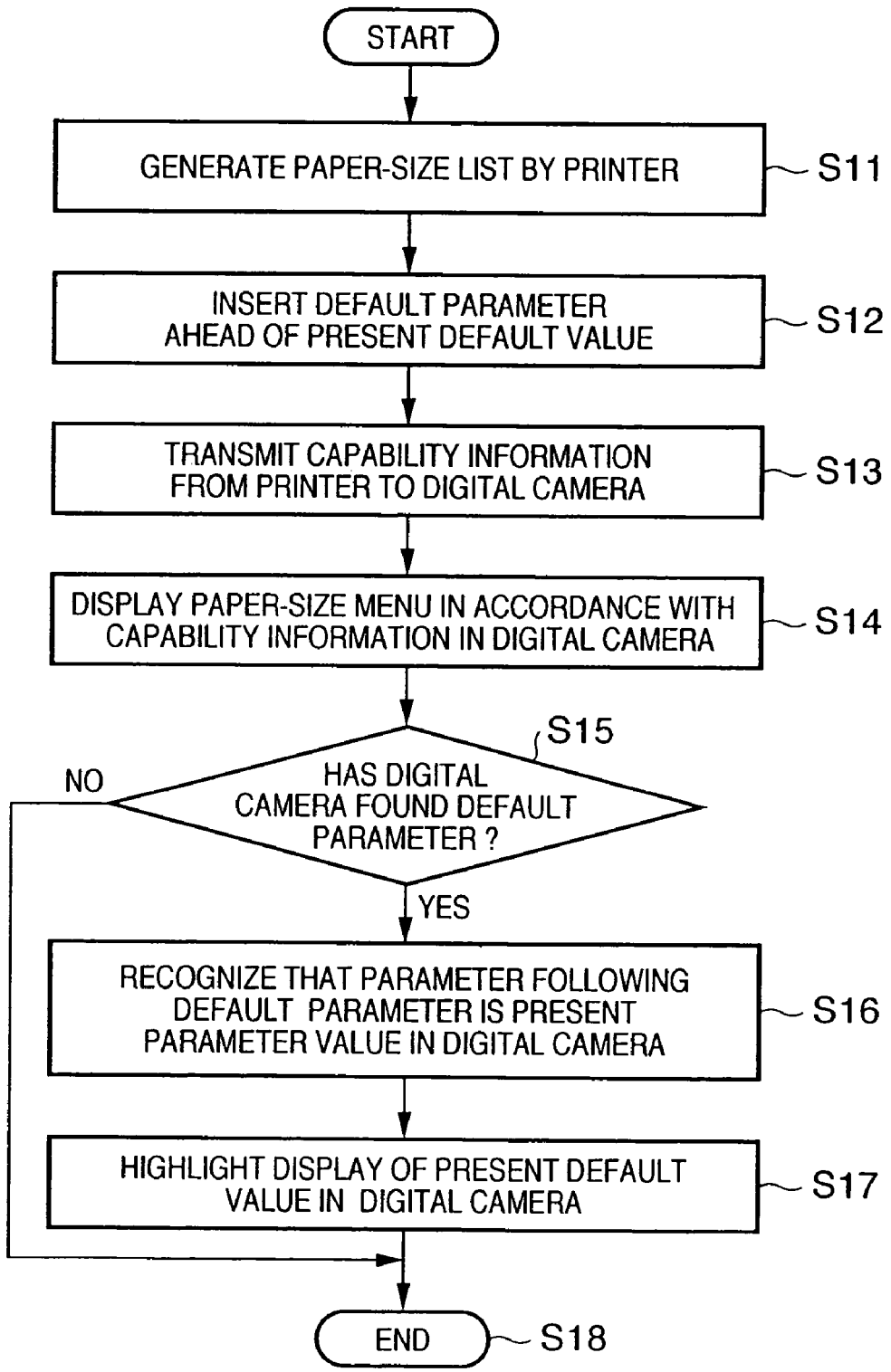
FIG. 6 is a flowchart illustrating an algorithm executed by the printing system of FIG. 1 according to a second embodiment of the present invention, which algorithm is for displaying, on the menu of a digital camera, a paper-size menu having defaults that have been set by a printer dynamically.

FIG. 6 is a flowchart illustrating an algorithm executed by the printing system 1 of FIG. 1 according to a second embodiment of the present invention, which algorithm is for displaying, on the menu of the digital camera 12, a paper-size menu having a default that has been set by the printer 12 dynamically.

First, at step S11, the printer 11 provides a paper-size list, which is a list of paper sizes supported by the printer 11, in the capability-information management memory 11a as list-format data of the kind shown in FIG. 4. With FIG. 4 serving as an example, the paper-size types supported by the printer 11 are four in number, namely L, 2L, postcard and A4. Next, at step S12, the direct-print controller 11b obtains a default paper size used upon being decided dynamically by the printer 11. For example, the direct-print controller 11b senses the status of a selection made at a control panel of the printer 11 or the size of paper that has actually been loaded in the printer and inserts a default parameter at the position immediately ahead of this paper size in the list-format paper-size data prepared at step S11. The default paper size is changed from time to time by operating the control panel (not shown) of the printer. In the example of FIG. 4, the postcard size is illustrated as corresponding to the default. However, it is assumed that this is changed dynamically to another paper size by a separate panel operation. It should be noted that "DEFAULT" is inserted immediately ahead of the default paper size in this embodiment, however, the present invention is not limited to this. It is possible to acquire vender information of a printer and a digital camera in advance, and the insertion position of "DEFAULT" is changed either immediately ahead of or immediately following the default value depending upon vender names of the printer and the camera known from the vender information.

Next, at step S13, the printer 11 transmits the prepared list-format paper-size data as capability information to the digital camera 12 via the PTP controller 11c and USB controller 11d. Then, at step S14, the digital camera 12 receives the capability information from the printer 11 via the USB controller 12d and PTP controller 12c and displays the menu of paper sizes. If it is assumed that the list-format data exemplified by FIG. 4 has been received, then five types of paper sizes, namely L, 2L, DEFAULT, postcard and A4, are displayed as the menu by the UI display controller 12e. At this time "DEFAULT" may be displayed as one choice in the menu or may not be displayed. If it is not displayed, then four types of paper sizes, namely L, 2L, postcard and A4, will be displayed as the menu of paper sizes.

Next, at step S15, the digital camera 12 searches for "DEFAULT" in the list-format paper-size menu received at step S14 and finds the position of "DEFAULT". If "DEFAULT" is found, then control proceeds to step S16. If "DEFAULT" is not found, then processing ends. At step S16, the digital camera 12 recognizes that the paper size at the position that immediately follows "DEFAULT" found at step S15 is the default paper size used upon being decided dynamically by the printer 11. Next, at step S17, the digital camera 12 highlights the display of the paper size recognized at step S16, thereby informing the user of which paper size the printer 11 is currently requesting.

The processing shown in FIG. 6 has been described taking paper size as an example for the sake of explanation. However, list-format data relating to media type or layout besides paper size may be placed in the capability information and displayed on the user interface of the digital camera.

Further, paper size and media type (paper type) are described above. However, it may be so arranged that the default condition is changed and transmitted to an image providing device such as a digital camera in accordance with the printer ink or apparatus structure, e.g., whether a doubled-sided printing unit is available. For example, if it is assumed that the printer can be set to accommodate monochrome ink, ordinary color ink and ink (photo ink) for high-quality prints and that the printer has actually been set to the ink (photo ink) for high-quality prints, then monochrome ink, ordinary color ink and ink (photo ink) for high-quality prints will be reported as the printer capabilities. At the same time, however, the ink (photo ink) for high-quality prints will be reported as the default. It will suffice if the way this information is sent utilizes the method of the first embodiment. If the printer has been equipped with a double-sided printing unit, then the ability to, turn doubled-sided printing on and off is transmitted as a capability and one of these options (e.g., double-sided printing OFF) is set as the default.

When conditions described in capabilities are displayed in list form on the side that has received the capability information, the item for which the default has been specified is displayed at the very top. Alternatively, it may be so arranged that the item for which the default has been specified (the photo ink in the example above) is first displayed in the selected state.

Thus, by transmitting the actual state of a device to the terminal of a communicating party upon incorporating the state of the device in capability information, the terminal can assume based upon this information that the item displayed initially as the choice is that for which the default has been specified.

If this arrangement is adopted, it becomes easier to select the condition that conforms the actual state of the device.

At the same time, it is possible to prevent printing errors and problems from being caused by print settings that do not conform to the state of the device.

Furthermore, even if a detailed print setting is not particularly made on the side on which the print settings are made, printing can be performed based upon print conditions suited to the current state of the device even if only a print instruction is issued in the default state as is.

Further, even greater convenience is achieved if the order of items in a list of capability information sent as printer capabilities is utilized as is and reflected in the user interface of the image output apparatus.

In other words, by placing the paper size, for example, that would be utilized most by the printer as high in the list as possible, there will be a greater possibility that processing selected by the user will be decided by fewer operations on the print settings menu displayed on the side of the image output apparatus.

Further, the foregoing is useful displaying a list while taking the neatness of the display into consideration.

Furthermore, as to the timing at which printer capability information is transmitted, the information may be transmitted automatically in response to the image output apparatus being connected to the printer, or transmitted in response to establishment of communication between the printer and the image output apparatus. Alternatively, the information may be transmitted in response to selection of the printing mode by operating the image output apparatus or the printer.

The reason for the above is that since execution of capability-information transmission is executed at the volition of the user who is to perform printing, the above-mentioned transmission timing is ideal in terms of the overall flow of processing and is ideal for causing the state of the printer immediately prior to printing to be incorporated in the capability information.

Thus, it is possible to convey information relating to the present default setting, which has been decided fixedly or dynamically as far as the printer is concerned. This is information that cannot be conveyed merely by sending printer capability information, such as paper size, to the digital camera as list-format data. As a result, if paper size, for example, is the item of interest, it is possible to ascertain which size of paper should be installed in the printer. Further, the invention is not limited to paper size. If printing is performed according to the default setting, it is possible to ascertain what the prevailing printing conditions are at the time.

Further, by including information indicative of "DEFAULT" as one of the capabilities in the capability information, default settings can be conveyed without complicated processing and without separately setting a special format.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image output apparatus for outputting image data to a printer by communication, comprising:
   a communication unit that communicates with the printer;
   a display unit that displays a choice of print conditions; and
   a setting unit that sets the choice of print conditions to be displayed on said display unit in accordance with capability information of the printer received by the communication unit,
   wherein the capability information includes first information relating to capabilities of the printer and second information indicating a default setting,
   wherein said setting unit sets a piece of the first information as default information of the printer based on the second information, and
   wherein said display unit displays the choice of print conditions in accordance with the default information set by said setting unit.

2. The apparatus according to claim 1, wherein the capability information is described in a list format in which list entries are the first information and the second information.

3. The apparatus according to claim 2, wherein said display unit displays the information indicating the default setting on a print settings menu as information attendant to the first information.

4. The apparatus according to claim 2, wherein the first information is an entry set forth ahead of or following an entry of the second information in the list, and wherein the first information is set as a default print condition.

5. The apparatus according to claim 1, wherein the second information is not displayed in the choice of print conditions.

6. A printer which inputs image data from an image output apparatus by communication, comprising:
   a communication unit that communicates with the image output apparatus; and
   a transmitting unit that transmits capability information representing capabilities of the printer to the image output apparatus via said communication unit,
   wherein the capability information is described in a list format in which list entries are first information which indicates capabilities of the printer and second information which indicates a default setting, and wherein an order of entries of the first and second information in the list is varied depending upon a state of the printer.

7. The printer according to claim 6, wherein the default setting is varied depending upon the state of the printer.

8. The printer according to claim 6, wherein the order of entries of the first and second information in the list is varied in accordance with vendor information acquired by communication with the image output apparatus via the communication unit.

9. A method of controlling an image output apparatus for outputting image data to a printer by communication, comprising:
   communicating with the printer;
   displaying a choice of print conditions; and
   setting the choice of print conditions to be displayed in accordance with capability information of the printer received by the communication,
   wherein the capability information includes first information relating to capabilities of the printer and second information indicating a default setting,
   wherein a piece of the first information is set as default information of the printer based on the second information, and
   wherein the choice of print conditions is displayed in accordance with the set default information.

10. The method according to claim 9, wherein the capability information is described in a list format in which list entries are the first information and the second information.

11. The method according to claim 10, wherein the information indicating the default setting is displayed on a print settings menu as information attendant to the first information.

12. The method according to claim 10, wherein the first information is an entry set forth ahead of or following an entry of the second information in the list, and wherein the first information is set as a default print condition.

13. The method according to claim 9, wherein said second information is not displayed in the choice of print conditions.

14. A method of controlling a printer which inputs image data from an image output apparatus by communication, comprising:

communicating with the image output apparatus; and transmitting capability information representing capabilities of the printer to the image output apparatus by communication;

wherein the capability information is described in a list format in which list entries are first information which indicates capabilities of the printer, and second information which indicates a default setting, and wherein an order of entries of the first and second information in the list is varied depending upon a state of the printer.

15. The method according to claim 14, wherein the default setting is varied depending upon the state of the printer.

16. The method according to claim 14, wherein the order of entries of the first and second information in the list is varied in accordance with vendor information acquired by communication with the image output apparatus.

* * * * *